United States Patent [19]
Woodland

[11] 4,300,428
[45] Nov. 17, 1981

[54] CHAIN SAW MILL

[76] Inventor: Dennis R. Woodland, Rte. #3, Parma, Id. 83660

[21] Appl. No.: 132,827

[22] Filed: Mar. 24, 1980

[51] Int. Cl.³ .............................................. B27B 17/00
[52] U.S. Cl. ...................................... 83/574; 83/794; 83/797; 83/801; 83/522
[58] Field of Search ................. 83/574, 794, 795, 797, 83/801, 522

[56] References Cited

U.S. PATENT DOCUMENTS

| | | | |
|---|---|---|---|
| 2,702,057 | 2/1955 | Miller | 83/795 |
| 3,134,409 | 5/1964 | Hayden | 83/794 X |
| 3,695,316 | 10/1972 | Pluckhahm | 83/574 |
| 3,926,086 | 12/1975 | Crane | 83/801 |
| 4,235,140 | 11/1980 | Reece | 83/794 |

*Primary Examiner*—Donald R. Schran
*Attorney, Agent, or Firm*—Paul F. Horton

[57] ABSTRACT

Apparatus for the precision cutting of lumber from logs by an attached chain saw, the apparatus comprising a frame, a rectilinear guide member mounted upon the frame, and a carriage mounted for longitudinal movement along the guide member. The carriage carries a chain saw adjustment control assembly which may be laterally set to precision cut slabs of a predetermined thickness from a log; which may be vertically set for cutting through logs of varying thickness; and which may be angulary set for greater cutting efficiency of the log. Log jacks and log dogs attached to the frame to prevent movement of the log relative to the frame may also be provided. The carriage may further be provided with a winch for pulling the cutting bar of the chain saw through the log.

11 Claims, 5 Drawing Figures

CHAIN SAW MILL

BACKGROUND OF THE INVENTION

1. Field of the Invention

This invention relates, in general, to guides for saws and, more particularly, to lumber mill apparatus for use with chain saws.

2. Description of the Prior Art

With the increased use and sales of chain saws has come the desire to use the chain saw for the cutting of logs into lumber useable for building material. A number of devices have been invented to this end as best typified by U.S. Pat. Nos. 4,146,962; 3,965,788; 3,092,156; and 3,051,203.

To obtain planar cuts and cuts of standard dimensions it is essential that the log being cut be rendered immovable; that the chain saw be drawn smoothly through the log without lateral pressure; and that the chain saw be moved without deviation relative to the guide member. Additionally, it is highly desirable that the saw bar be placed at an efficient cutting angle relative to the log and that the process not be time consuming. It is also important that the chain saw be readily removable from the guide apparatus for conventional cutting purposes.

Prior art devices, for the most part, are simply not adequate to provide the precision cutting which is required for building materials. Guide members in the existing art must be generally reset on the log after each slab is cut. Additionally, the guides must themselves be straight requiring a flat surface to begin the procedure. Such surfaces are ordinarily provided by a plank being nailed directly to the log. This, in itself, is laborious and time consuming and often is not at all practical due to the natural cylindrical shape of the log. For this reason, an initial cut is often made in the log to make the supporting surface for the guide member as planar as possible. Besides log waste, such attempts are particularly frustrating and often unsuccessful. The overwhelming defect in prior art devices, however, is the necessity of controlling the saw itself by the hand. In pulling the saw bar through the log during the cutting procedure of the chain saw, the bar invariably wavers from side to side because of the vibration of the saw and the inability of the operator to control such movement. The log acts as a fulcrum in its contact with the cutting edge on the saw bar and the chain saw, from handle to end of cutting bar, is akin to a lever. A slight movement from the plane close to the fulcrum causes an aggravated movement from the plane toward the tip of the cutting bar.

SUMMARY OF THE INVENTION

The present invention comprises lumber making apparatus for the cutting of wood by an attached chain saw including a guide which is detached from and is independent of the log to be cut; a frame upon which the guide is mounted; a carriage adapted for longitudinal movement along the guide member; and a control assembly mounted on the carriage and operable to control, with precision, depth of lateral cut, depth of vertical cut, and angulation of the cutting bar of the saw relative to the log. A more complete description may be found in the appended claims.

It is therefore a primary object of the present invention to provide apparatus for the precise and efficient cutting of lumber by means of a chain saw.

It is further an object of the present invention to provide apparatus controlling the width and depth of cut as well as the angulation of cut by a chain saw.

It is also an object of the present invention to provide chain saw mill apparatus in which a carriage and guide are mounted separately and independently of the log being cut.

Another object of the present invention is to provide a chain saw mill which frees the operator from positioning the saw directly by hand.

A still further object of the present invention is to provide a chain saw mill to which a chain saw may be readily mounted and dismounted.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
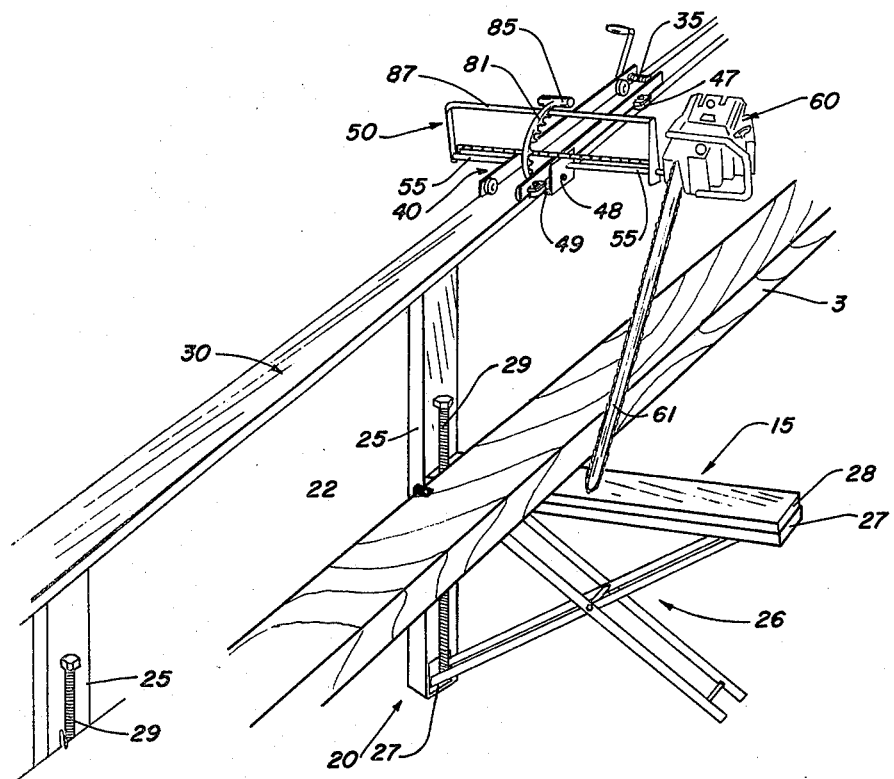
FIG. 1 is a schematic representation of a preferred embodiment of the chain saw mill of the present invention with a conventional chain saw attached.

Referring now to the drawings, and more particularly, to FIG. 1, an embodiment to be preferred of the chain saw mill 10, made according to the present invention is disclosed. Chain saw mill 10 includes a frame 20, a guide member 30, a carriage 40, and a chain saw adjustment control assembly 50.

The frame assembly 20 includes at least two spaced support standards 25 of suitable height, to each of which is attached a scissor jack 26. Each of the jacks 26 is pivotally secured adjacent the base of standard 25 by means of a pivot pin and bracket assembly 27. Each of the standards 25 are provided with a cross member assembly designated generally by the numeral 15, as shown to advantage in FIG. 4.

Each cross member assembly 15 includes a C-shaped clamp 16 adapted for vertical sliding on standard 25 and which may be held in a selected vertical position by means of clamp screw 17 which engages a threaded aperture on the clamp and holds the clamp in position by frictional contact with the standard. Clamp 16 carries, on its side, a log dog bracket 21 and carries a transverse, preferably steel, cross member 27 which may be attached to clamp 16, as by welding. Each cross member 27 is adapted for seating on a scissor jack 26 and slidably engages the uppermost surfaces of the legs of the jack. A wooden log support member 28 of 2×4 size is attached to the upper surface of cross member 27 by bolts, not shown, for convenient replacement. Log support member 28 may be kerfed during the cutting process so that the log may be cut completely through, as will hereinafter be explained. Each of the standards 25 are equipped with a log dog 22 adapted for hooking the log and holding the log in position. Log dogs 22 are each carried by a draw bar 23 slidably engageable in bracket 21. Draw bar 23 permits lateral movement of the dogs 22 and is secured in place by screw 24 in the same manner as clamp screw 17.

Adjacent the medial portion of the rear side of each of the standards 25 is a jack screw 29, as may be seen in FIG. 1. The jack screw engages a threaded aperture of cross member 27 and a fixed portion of standard 25, not shown, to raise and lower the scissor jack, as desired.

Figure 4:
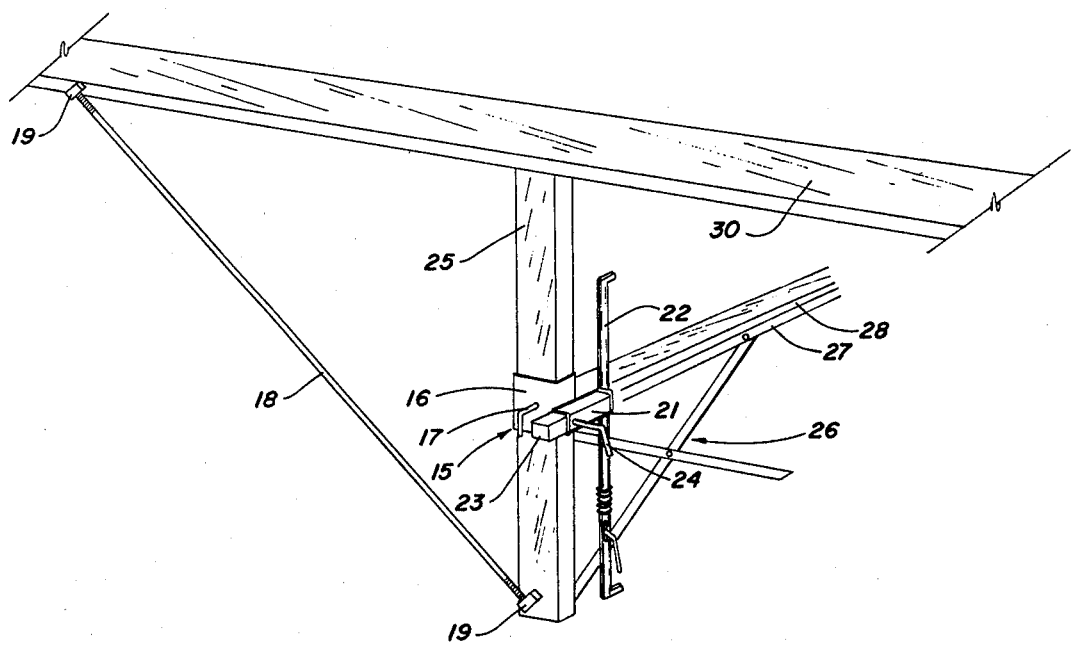
FIG. 4 is a schematic representation showing the support assembly of the present invention.

Mounted on each of the standards 25 is a guide member 30. Guide member 30 is preferably a tubular, metallic, rectilinear bar substantially rectangular in cross section. The guide member extends between standards and may overhang the standards for a considerable distance. The guide is attached to the uppermost terminal end of the standards as by welding. Where there is a considerable longitudinal overhang of the guide member beyond a particular standard, a threaded support rod 18 threadably received in brackets 19 secured to both the standard and the guide member 30, as shown in FIG. 4, may be provided. Rod 18 is provided with oppositely wound threads at its opposing ends so that the effective length of the rod may be lengthened or shortened by turning the rod in the brackets, thereby assuring a level guide member.

Figure 2:
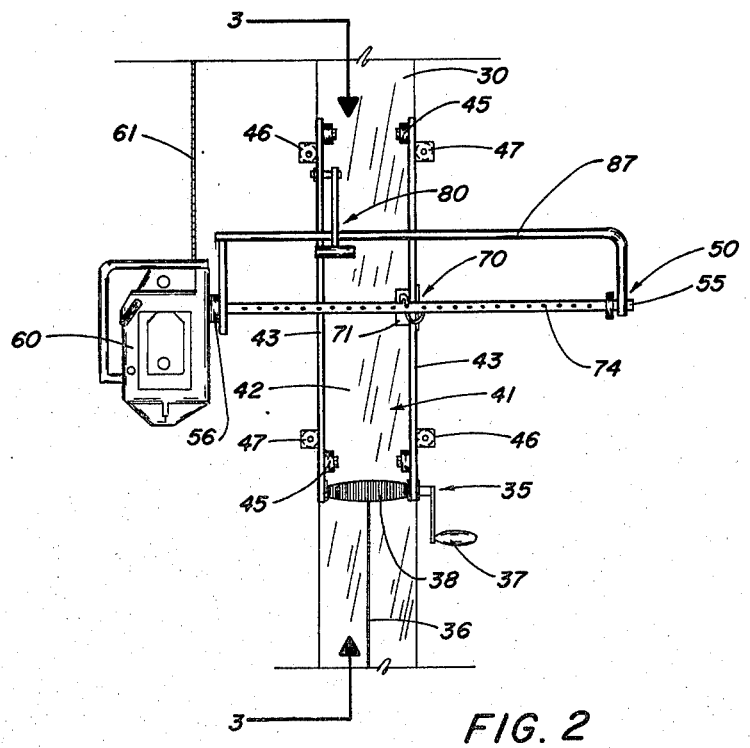
FIG. 2 is a plan view of the carriage, control assembly, and guide member of the present invention.
Figure 3:
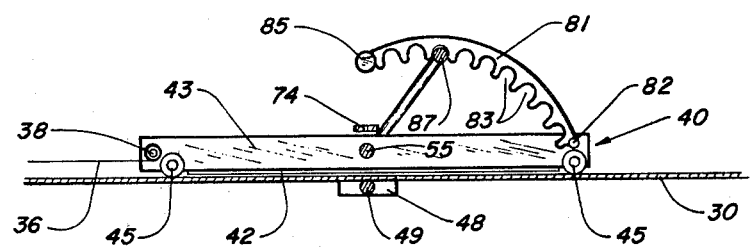
FIG. 3 is a side elevation, in section, of the carriage, control assembly and guide of the present invention, taken along 3—3 of FIG. 2.

Referring now to FIGS. 2 and 3, taken in conjunction with FIG. 1, the carriage 40 of the present invention may be seen to advantage. Carriage 40, in the preferred embodiment, includes a carriage housing 41 made preferably of channel iron. Housing 41 includes a base portion 42 and a pair of upstanding sides 43 to define a housing which is substantially U-shaped in cross section. Two pair of vertically mounted rollers, designated generally by the numerals 45, are supported on the sides 43 of the housing by means of appropriate bearing shafts. Rollers 45 support the carriage for longitudinal movement along guide member 30. Four housing brackets, designated generally by the numeral 46, extend outwardly transverse to the side walls 43 of the housing. Brackets 46 each carry, by means of appropriate bearing shafts, horizontal rollers 47 adapted to engage opposing sides of guide member 30 for lateral support. Carriage 40 is also provided with a pair of downwardly depending brackets 48 shown to advantage in FIG. 1, to which are mounted a pair of vertically oriented rollers 49 adapted to engage the lower surface of guide member 30 for vertical support. Adjacent its rearmost end, carriage 40 is provided with a winch 35 having a tether 36 which is attached at one end to the rearmost terminal end of guide member 30 and which is attached at its other end to drum 38 of the winch. It will be seen that as drum 38 of the winch is rotated by handle 37 that the carriage will be pulled rearwardly along guide member 30 for the purpose of pulling the chain saw through a log during cutting, as will hereinafter be explained.

Mounted on the upper surface of carriage 40 is chain saw adjustment control assembly 50, of the present invention. Control assembly 50 includes a horizontally projecting shaft 55 extending through and journaled for rotation in sidewalls 43 of carriage 40. Shaft 55 is also adapted for lateral as well as rotational movement relative to the carriage. A chain saw bracket plate 56 is secured to one end of shaft 55, by welding or otherwise, for rotation therewith. Bracket 56 is provided with a pair of spaced apertures operable to receive bolts 54 for attachment of a conventional chain saw 60. The bolts used for attaching the bracket to the chain saw may be the same bolts that are used for connecting the chain saw bar 61 to the chain saw housing. It is to be noted that the attachment of shaft 55 to the chain saw 60 is at the exact attachment of the chain saw bar to the chain saw housing, thereby providing a pivot point which is spatially close to the point where cutting bar 61 makes contact with the log to be cut. Further, no new holes need be drilled in the cutting bar of the chain saw.

Figure 5:
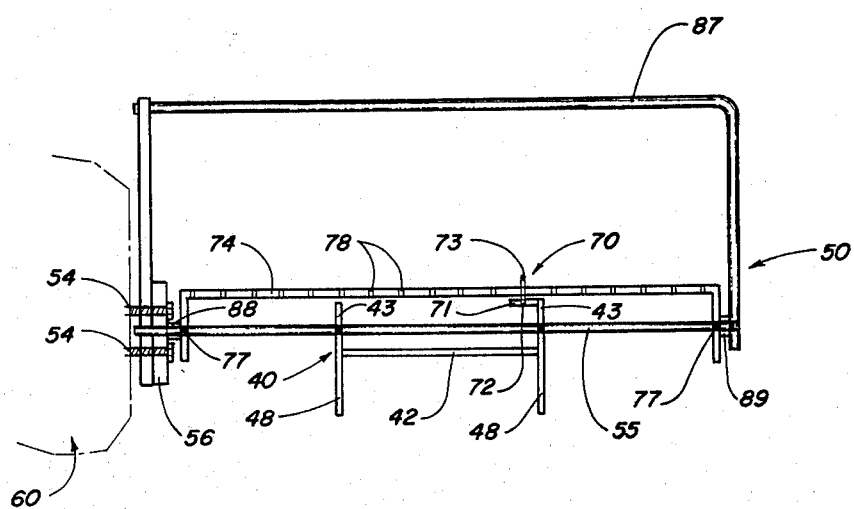
FIG. 5 is a frontal schematic in partial section showing attachment of the control assembly to the carriage.

Central assembly 50 is provided with first lock means, designated generally by the numeral 70, for holding shaft 55 in a selected lateral position relative to carriage 40, as shown to advantage in FIG. 5. First lock means 70 includes a base plate 71 affixed to sidewall 43 of carriage 40. Base plate 71 includes one or more apertures 72 operable to receive a lock pin 73. A lock plate 74 is mounted to shaft 55 by means of sleeves 77 to allow rotation of shaft 55 relative to lock plate 74. Lock plate 74 is held in a fixed lateral relationship with shaft 55 and moves laterally therewith. The lock plate is positioned over base plate 71, parallel with shaft 55. The lock plate is provided with a series of laterally spaced apertures 78 alignable with aperture 72 of base plate 71 so that the lock plate and hence shaft 55 may be secured by means of lock pin 73 in a selected lateral position relative to carriage 40.

Control assembly 50 further includes a second lock means, designated generally by the numeral 80. Second lock means 80 includes a lock bar 87 of substantially inverted U-shaped configuration. Lock bar 87 is securely attached to shaft 55 by welding or otherwise so as to be rotatable therewith. Lock bar 87 is preferably separated from lock plate 74 at one end of the shaft by spacer 89 and is separated from the lock plate at the other end of the shaft by chain saw mounting bracket 56 and spacer 88. An arcuate rack 81, as shown in FIGS. 1 and 3, operable to hold lock bar 87 in a fixed rotational relationship relative to carriage 40 is mounted to one of the sidewalls 43 of the carriage by means of a pivot pin 82. Rack 81 on its inner curvature is provided with a series of adjacent slots 83 operable to receive and hold lock bar 87 in position. The rack is provided with a handle 85 for pivoting the rack by hand. The curvature of rack 81 is substantially equal to the rotational arc of lock bar 87 on shaft 55.

For operation of the apparatus, a chain saw 60 is first mounted to chain saw mounting bracket 56 of control assembly 50 by means of bolts 54. A log 3 is then placed upon log support members 28 located on adjacently spaced scissor jacks 26. The log is placed parallel to guide member 30 and is leveled by operation of jack screws 29 which raise or lower each of the scissor jacks 26. In raising or lowering the scissor jacks, clamps 16 carrying cross members 27, seated upon the jacks are moved upwardly or downwardly on vertical standards 25. Log dogs 22, also carried by clamps 16, are also moved vertically upward or downward. Once the log has been leveled, clamps 16 are fixed in place by means of clamp screws 17 in their engagement with the standards. Log dogs 22 are then moved inwardly or outwardly as they are carried by log dog draw bars 23 within brackets 21. The log dogs are then clamped onto the log and clamp screws 24 are tightened to hold the log in an immovable level position.

After leveling the log, rack 81 is pivoted backwardly by means of handle 85 so as to disengage lock bar 87. Pin 73 holding lock plate 74 and therefore shaft 55 in a fixed lateral position is also removed. Chain saw 60 is then moved laterally and outwardly beyond the log. Carriage 40 is then retracted so that cutting bar 61 of chain saw 60 engages the top surface of wooden log support member 28 so that the bar is placed at a maximum horizontally inclined position relative to the log support member. In this regard, it should be noted that greater cutting efficiency is achieved by having a chain saw bar in an oblique position relative to the log. The rack is then lowered onto lock bar 87 to hold the saw in the fixed angular relationship, just described. Carriage 40 is then moved forwardly along guide member 30 until cutting bar 61 of the chain saw is positioned at the forwardmost end of the log. Shaft 55 and attached lock plate 74 are then moved laterally a desired distance to permit a desired width of the log to be cut. The respective apertures of lock plate 74 and base plate 71 are then aligned for the selected width of cut and pin 73 is inserted through the respective apertures to hold the lock plate and therefore shaft 55 in a fixed lateral position. It will be seen then, in this manner, that the chain saw, securely attached to shaft 55 of control assembly 50, has been positioned for precise depth, precise width of lumber to be cut, and for most efficient cutting angle.

The chain saw may now be started with the chain bar spaced adjacent to the forwardmost portion of the log. The operator then slowly rotates drum 38 of winch 35 by means of handle 37 causing tether 36 to be wound upon the drum. By so doing, the carriage is slowly retracted toward the rearwardmost end of guide member 30 causing the cutting elements of cutting bar 61 of chain saw 60 to engage the log and cut through the log. It will be noted that chain saw 60 is not manually grasped and unwanted lateral pressures on the saw are thereby eliminated. Once the end of the log has been reached, the process if simply repeated by once again moving the carriage forward to the forwardmost end of the log. The log may be rotated and held in a fixed rotated position by the log dogs to obtain lumber of desired dimensions. It is expected that slight kerfs will be made in the wooden log support members 28 as the chain saw is drawn over the supports. This is most often necessary to obtain sufficient cutting depth on the log. The log support members 28 may be replaced, at will.

Having thus described in detail a preferred embodiment of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Lumber making apparatus for the cutting of wood by an attached chain saw comprising:
   a frame;
   a longitudinal guide member mounted on said frame;
   a carriage mounted on said guide member, said carriage adapted to travel to and fro on said guide member; and
   a chain saw adjustment control assembly mounted on said carriage, said control assembly including shaft means rotatably and laterally slidably received in said carriage, said shaft means including chain saw attachment means adjacent a terminal end thereof; first lock means operable to secure said shaft in a laterally selected position; and second lock means operable to secure said shaft in selected rotational position whereby the cutting bar of an attached chain saw may be rigidly secured at a preselected angulation and lateral position relative to said carriage.

2. The apparatus as defined in claim 1 wherein said first lock means comprises:
   a base plate affixed to said carriage, said base plate having one or more apertures operable to receive a lock pin;
   a lock plate mounted to and rotatably receiving said shaft means and adapted for lateral movement therewith, said lock plate slidably engaging said base plate and said lock plate provided with a plurality of laterally spaced apertures alignable with the apertures of said base plate; and
   a lock pin adapted to engage aligned apertures of said lock plate and said base plate to hold said plates in a selected fixed position relative to one another.

3. The apparatus as defined in claim 1 wherein said second lock means comprises:
   a lock bar spaced parallel with and affixed to said shaft means for rotation therewith; and
   a rack pivotably engaging said carriage, said rack provided with a plurality of adjacently spaced slots operable to receive said lock bar and to secure said lock bar in a selected angular position relative to said carriage.

4. The apparatus as defined in claim 3 wherein said rack is arcuate in configuration having a curvature substantially equal to the rotational arc of said lock bar.

5. The apparatus as defined in claim 1 wherein said guidemember is substantially rectangular in cross-section having substantially planar opposing surfaces and wherein said carriage includes a plurality of rollers adapted to engage the opposing surfaces of said guidemember to hold said carriage in firm contact with said guidemember.

6. The apparatus as defined in claim 1 wherein said frame includes at least two horizontally spaced standards supporting said guide member, each of said standards provided with an attached scissor jack for raising or lowering logs placed thereupon and each of said standards provided with a vertically moveable cross member seated upon one of said scissor jacks for supporting logs placed thereupon.

7. The apparatus as defined in claim 6 further comprising means for securing said crossmembers at a fixed vertical position relative to said standards.

8. The apparatus as defined in claim 6 further comprising at least two log dogs, each of said log dogs attached to one of said standards and operable to clamp a log to said standard;

9. Lumber making apparatus for the cutting of wood by an attached chain saw comprising:
   a frame having at least two standards;
   a rectilinear guide member horizontally mounted on said standards, said guide member including opposing planar surfaces;
   a carriage including a plurality of rollers firmly engaging the planar surfaces of said guide member for transporting said carriage longitudinally along said guide member; and
   a chain saw control assembly mounted on said carriage, said control assembly including a shaft journaled for rotational movement and lateral movement relative to said guide member in said carriage; and means for attaching a chain saw to said shaft;

and means for locking said shaft in a preselected lateral and rotational angulation whereby an attached chain saw may be positioned laterally and to a desired depth and cutting angle relative to said guide member.

10. The apparatus as defined in claim 9 further comprising:

jack means operable to support a log in preparation for cutting; and cross members transversely projecting from each of said standards; each of said cross members adapted for seating upon said jack means and each of said cross members vertically movable upon each of said standards for securing said cross members at a selected height.

11. The apparatus as defined in claim 9 further comprising a winch mounted on said carriage, said winch including a rope securable at one end to said guide member and the other end secured to the rotatable drum of said winch whereby rotation of the drum is operable to retract said carriage along said guide member for the cutting of a log.

* * * * *